US007398989B2

(12) United States Patent
Laffin

(10) Patent No.: US 7,398,989 B2
(45) Date of Patent: Jul. 15, 2008

(54) STAND-UP WHEELCHAIR WITH GEARING DOWN OF THE STAND-UP OPERATION

(75) Inventor: François Xavier Laffin, Suisse (CH)

(73) Assignee: Lifestand International SA, Suisse (CH)

( * ) Notice: Subject to any disclaimer, the term of this patent is extended or adjusted under 35 U.S.C. 154(b) by 596 days.

(21) Appl. No.: 11/134,281

(22) Filed: May 23, 2005

(65) Prior Publication Data

US 2006/0012147 A1 Jan. 19, 2006

(30) Foreign Application Priority Data

May 24, 2004 (FR) .................................. 04 05578

(51) Int. Cl.
*B62B 3/02* (2006.01)

(52) U.S. Cl. ....................... 280/642; 280/643; 280/647; 280/650; 280/47.38; 297/330; 297/331; 297/334; 297/320; 297/321; 297/DIG. 4; 297/DIG. 10

(58) Field of Classification Search ................. 280/642, 280/643, 647, 650, 47.38; 297/330, 331, 297/334, 320, 321, DIG. 4, DIG. 10
See application file for complete search history.

(56) References Cited

U.S. PATENT DOCUMENTS 3,640,566 A * 2/1972 Hodge ......................... 297/68
4,569,556 A * 2/1986 Pillot ......................... 297/316
4,598,944 A * 7/1986 Meyer et al. ............. 297/183.9
4,623,194 A * 11/1986 Pillot ......................... 297/316
4,637,652 A * 1/1987 Bergenwall .................. 297/90
5,108,202 A * 4/1992 Smith ......................... 297/330
5,346,280 A * 9/1994 Deumite ..................... 297/330
5,556,121 A * 9/1996 Pillot ...................... 280/304.1
6,192,533 B1 * 2/2001 Porcheron ..................... 5/86.1
6,244,662 B1 * 6/2001 Porcheron ................... 297/383
7,077,416 B2 * 7/2006 Duarte .................... 280/304.1

FOREIGN PATENT DOCUMENTS

FR 2769830 4/1999

* cited by examiner

*Primary Examiner*—Christopher Ellis
*Assistant Examiner*—Jacob Meyer
(74) *Attorney, Agent, or Firm*—Clark & Brody

(57) ABSTRACT

A stand-up type wheelchair for handicapped and sick people comprises a chassis (2) supporting an articulated structure (12) which includes a seat, a foot-rest, a chair-back, and two symmetrical lateral articulated systems. Each system includes

- a first deformable polygon contributing to the support of the seat,
- a second deformable polygon, contributing to the support of the foot-rest,
- a chair-back quadrilateral (four-bar linkage) (35) articulated on the first quadrilateral, and a manoeuvring assembly (40), which includes a first lever (41), a second lever (43), and a manoeuvring handle (49).

The manoeuvring handle (49) is articulated firstly on the second lever (43) and/or the first lever (41), and secondly on the first quadrilateral by means of a connecting-rod (55) whose first extremity is connected by a pivot to the first quadrilateral and whose second extremity is connected by a pivot (58) to the manoeuvring handle (49).

8 Claims, 2 Drawing Sheets

STAND-UP WHEELCHAIR WITH GEARING DOWN OF THE STAND-UP OPERATION

FIELD OF THE INVENTION

This present invention concerns wheelchairs used by handicapped people and sick people, and it is intended to cover wheelchairs with manual or electric propulsion, independently, folding or not.

BACKGROUND OF THE INVENTION

More particularly, the invention concerns devices known as "stand-up" wheelchairs, that allow their user to occupy a sitting position or a standing position. Such wheelchairs, as described in patent FR 2 769 830 for example, include a chassis supporting an articulated structure which includes a seat, a foot-rest, a chair-back, and two symmetrical lateral articulated systems performing the function of raising and lowering the seat, the chair-back and the foot-rest, in order to allow the passage of a user of the wheelchair from a sitting position to a standing position.

To this end, each lateral articulated system includes a first deformable polygon or quadrilateral (four-bar linkage) contributing to the support of the seat, composed of two bars, upper and lower respectively, articulated on a front part of the chassis and connected to their rear part by a distance piece.

Each lateral articulated system also includes a second deformable polygon or quadrilateral contributing to the support of the foot-rest, and an articulated chair-back frame on the first quadrilateral opposite to the second quadrilateral, by means of the distance piece at least.

Each articulated lateral system finally includes a manoeuvring assembly, positioned between the first quadrilateral and the chassis, which includes, on the one hand, a first articulated lever on the rear part of the chassis and at the extremity of a second lever whose other extremity is articulated on the first quadrilateral, as well as a manoeuvring handle attached to the second lever. The manoeuvring handle performs a command and control function for the relative pivoting of the lateral system from a lowering position to a raising position of the structure in relation to the chassis and vice versa.

The manoeuvring assembly also includes a device to assist with the raising-lowering movement, such as a pneumatic spring for example. In order to enable it to be gripped easily, regardless of the position of the articulated structure, the manoeuvring handle includes a bow-shaped gripping area which is open at its centre, consisting of two branches connected by a web-linkage, each providing a contact area for the palm of a user's hand.

Such a stand-up type chair completely fulfils the function of raising and lowering its user, who is thereby able to move from a sitting position to a standing position with no assistance, human or mechanical, other than that provided by the pneumatic spring.

Nevertheless, despite the satisfaction obtained through the extreme ease of passage between the two positions, standing and seated, it has appeared necessary, in order to further increase the comfort and convenience of the user, to gear down the movement of the handle in order to reduce its amplitude of motion, so that the handle always remains close to the user, allowing him or her to apply full force during the stand-up movement, which corresponds to a turning motion of the hands during manual movement of the wheelchair.

BRIEF DESCRIPTION OF THE INVENTION

In order to meet this requirement for comfort and convenience, the invention concerns a stand-up type wheelchair for handicapped and sick people, consisting of a chassis supporting an articulated structure which includes a seat, a foot-rest, a chair-back, and two symmetrical lateral articulated systems each including:

- a first deformable polygon or quadrilateral, contributing to the support of the seat, composed of two bars, upper and lower respectively, articulated on the front part of the chassis and connected to their rear parts by a distance piece,
- a second deformable polygon or quadrilateral, contributing to the support of the foot-rest,
- a chair-back frame articulated on the first quadrilateral, opposite to the second quadrilateral, by means of the distance piece at least,
- and a manoeuvring assembly, positioned between the first quadrilateral and the chassis, which includes a first articulated lever on the rear part of the chassis and at the extremity of a second lever whose other extremity is articulated on the first quadrilateral, as well as a manoeuvring handle which performs a command and control function for the relative pivoting of the lateral systems, from a lowering position to a stand-up position of the structure in relation to the chassis and vice versa.

According to the invention, the stand-up wheelchair is characterised in that, for each manoeuvring assembly, the manoeuvring handle is articulated, firstly on the second lever and/or the first lever, and secondly on the first quadrilateral, by means of a connecting-rod whose first extremity is connected by a pivot to the first quadrilateral and whose second extremity is connected by a pivot to the manoeuvring handle.

This articulation of the handle therefore achieves a large reduction in its movement in relation to the movement of a handle which has been attached with no articulation to the second lever, in a manner which is highly advantageous. In addition, this gearing-down of the movement of the handle enables it to be placed in a position that is compatible with different depths of seat, so that a similar chair structure can be created for users of different height.

It would be advantageous if the distance of the two pivots of the connecting-rod were chosen so as to set the amplitude of movement of the manoeuvring handle in an optimal manner.

According to the invention, the manoeuvring handle can be articulated at different positions of the assembly formed by the first and second levers. In a preferred but exclusive form of implementation, the manoeuvring handle is articulated on the assembly formed by the first lever and the second lever at the linking pivot between the first and second levers.

According to another characteristic of the invention, in order to further aid the user in the execution of the stand-up movement, the wheelchair includes a device to assist with the raising-lowering movement such as, for example but not exclusively, a state-changing, gas-operated actuator or spring.

In a preferred but not exclusive form of implementation, in order to provide for automatic locking of the articulated structure in the sitting position, the articulation axis of the connecting pivot between the connecting-rod and the first quadrilateral is located, in the sitting position of the wheelchair, above a straight line passing firstly through the articulation pivot of the handle on the first and/or the second lever, and secondly the articulation pivot of the connecting-rod on the handle. This advantageous characteristic of the invention guarantees the user of the wheelchair against an unexpected triggering of the stand-up movement under the effect of the gas actuator.

In the same sense, according to another characteristic of the invention, and in order to provide for automatic locking of the articulated structure in the sitting position of the chair, the axis of the articulation pivot of the second lever on the first quadrilateral is located below a straight line passing firstly through the articulation pivot between the first and the second levers and secondly the articulation pivot of the first lever on the rear part of the chassis.

In the same manner, it can appear advantageous to guarantee the user, when in the standing position, against an unintended triggering of the return movement to the sitting position. To this end, in order to provide for automatic locking of the articulated structure in the stand-up position, and in accordance with another characteristic of the invention, the articulation axis of the connecting pivot between the first and the second levers, in the stand-up position of the wheelchair, is located above a straight line passing firstly through the articulation pivot of the first lever on the rear part of the chassis and secondly the articulation pivot of the second lever on the first quadrilateral.

With the same objective, aimed at ensuring automatic locking of the articulated structure in the stand-up position, the articulation axes of the handle pivots, in the stand-up position of the wheelchair, are located on either side of the straight line passing firstly through the articulation pivot of the first lever on the rear part of the chassis and secondly the articulation pivot of the second lever on the first quadrilateral.

Various other characteristics of the invention will emerge from the following description, presented with reference to the appended drawings which show a preferred, non-limited form of implementation of a stand-up type chair for handicapped or sick people, including a handle whose position is adjustable in accordance with the invention.

DETAILED DESCRIPTION OF THE INVENTION

Figure 1:
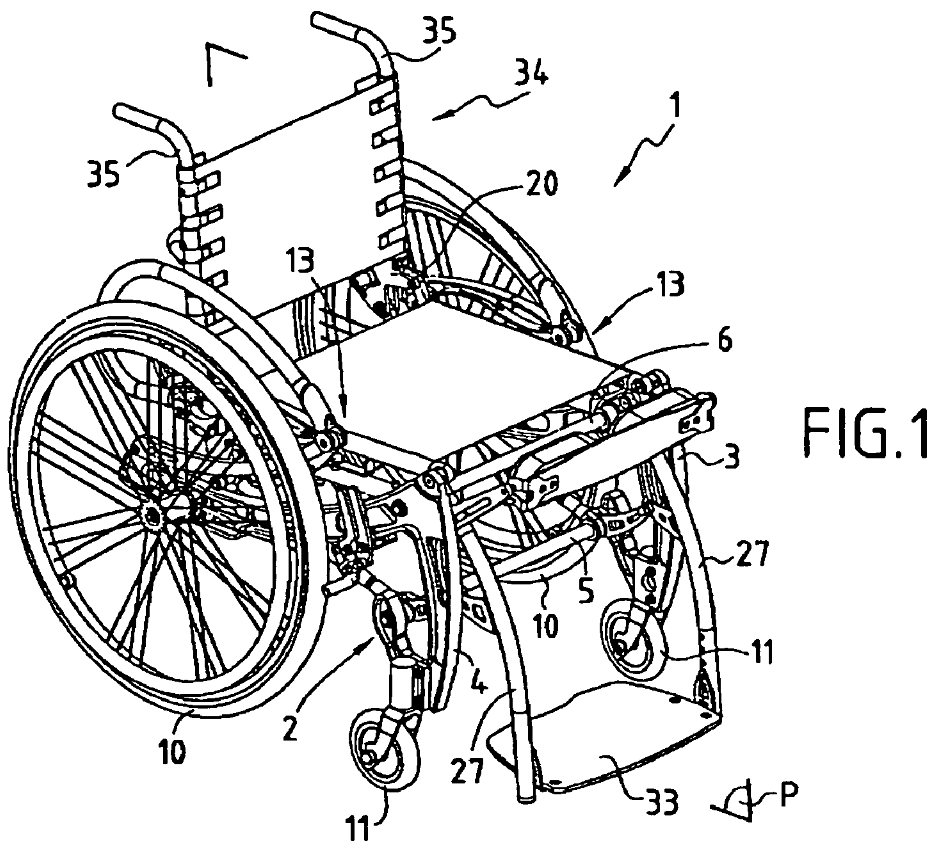
FIG. 1 is a perspective drawing of a stand-up wheelchair according to the invention.
Figure 3:
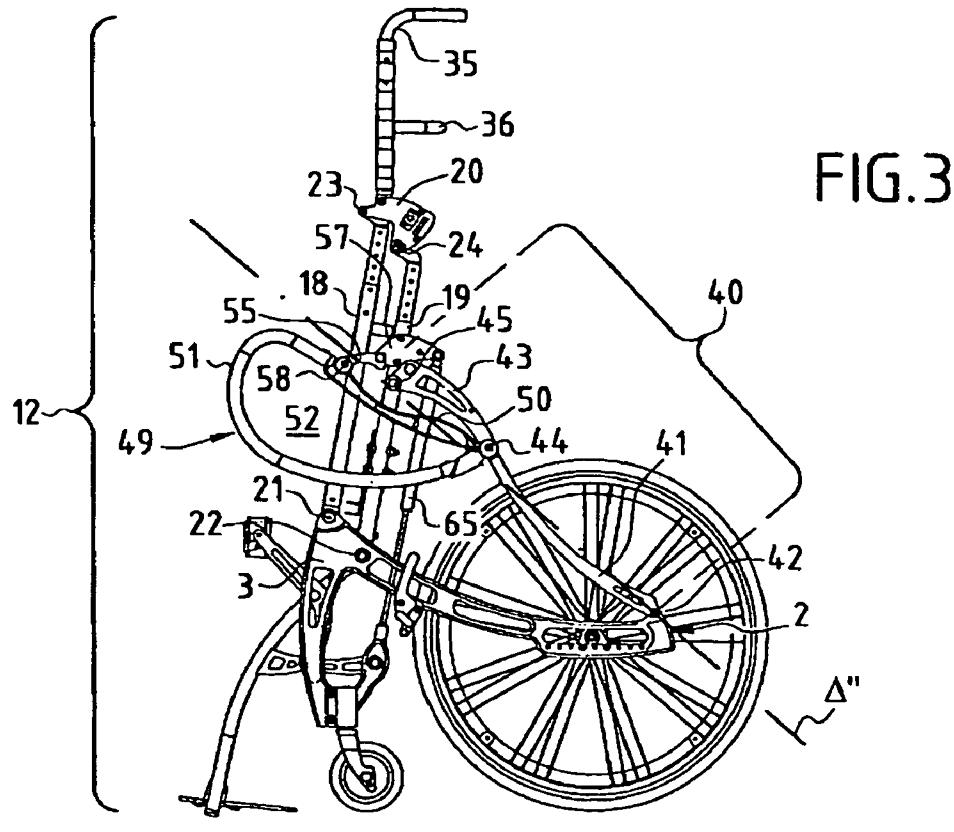
FIG. 3 is an elevation, similar to FIG. 2, of the wheelchair in the raised or standing position.
Figure 2:
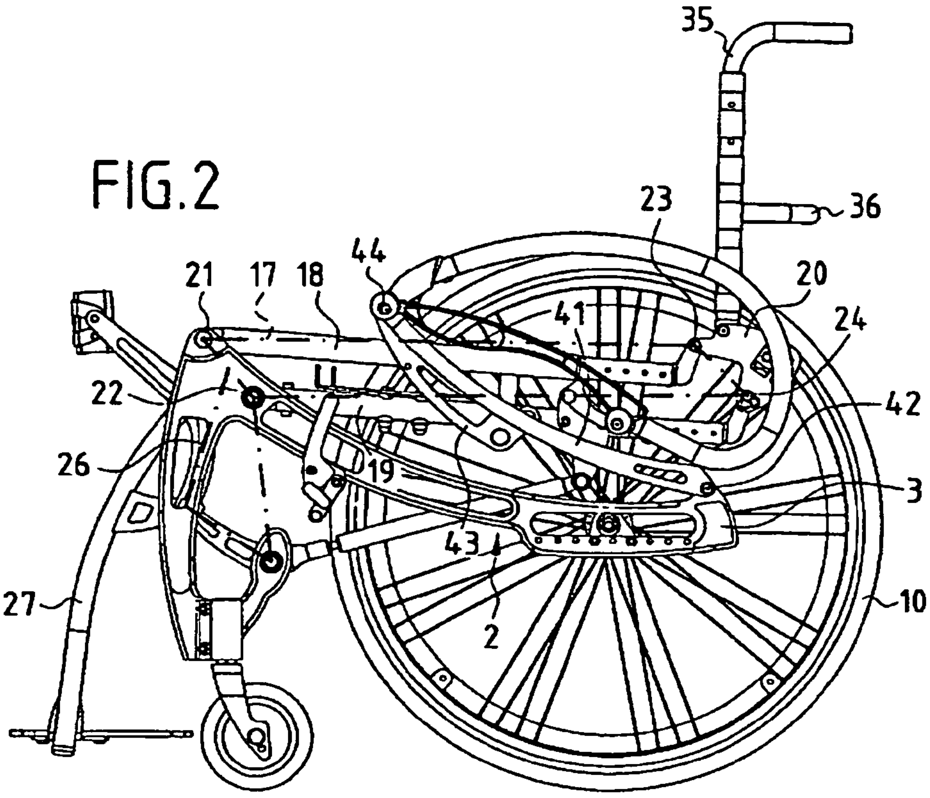
FIG. 2 is an elevation, seen from the left and without the left wheel, of the wheelchair illustrated in FIG. 1, in the sitting or lowered position of the wheelchair.

The invention aims to reduce as much as possible the amplitude of the movement necessary to execute the function of raising a stand-up type wheelchair, as illustrated in FIGS. 1 to 3, while incorporating a high degree of safety and security into this stand-up function.

A stand-up wheelchair 1 includes a chassis 2, composed of two lateral half-chassis 3 and 4, joined together by crosspieces 5 and 6, as well as a crossbar, not shown, connecting the wheels. These different components constitute a support frame which is fitted with drive wheels 10 and movable steering wheels 11.

As illustrated, the chassis 2 is a wheelchair of rigid design, but it is very obvious that a more-or-less similar construction could be employed for a folding wheelchair. In such a case in fact, the rigid crosspieces 5 and 6 are then replaced by folding elements of a design which is known in its own right.

The chassis 2, described above, is equipped with a raising or stand-up arrangement which is implemented in the form of an articulated structure 12 carried by the chassis 2. The articulated structure 12 is composed of two lateral articulated systems which are symmetrical in relation to a sagittal plane P and which are more particularly visible in FIGS. 2 and 3. Each articulated system 13 is designed to be adapted laterally to the chassis 2, to each of the two half-chassis 3 and 4 for example.

Each articulated system 13 includes a first deformable polygon and, according to the example, a deformable quadrilateral 17 composed of two bars 18 and 19, called the upper and lower bars respectively, though in the representation illustrated in FIG. 3, they are not located in the same vertical plane. The bars 18 and 19 are joined at their rear-ends by a distance piece 20 and are mounted on the chassis 2 close to the front part of the latter by a first articulation point 21 for the upper bar 18 and by a second articulation point 22 for the lower bar 19. In this present case, articulation point 21 is located at the upper part of the two corresponding half-chassis 3, 4 while articulation point 22 is located on this same half-chassis behind and below articulation point 21.

In the illustrated example, the distance of articulation points 23, 24 of the bars 18, 19 on the distance piece 20 is designed to be equal to the distance separating articulation points 21 and 22, so that the quadrilateral 17 takes the favoured shape of a deformable parallelogram, though such a shape should not be considered to be strictly necessary for the implementation of a wheelchair according to the invention.

Each articulated system 13 also includes a second deformable polygon and, in the case in point, a deformable quadrilateral 26, illustrated in FIG. 2 by a dotted and dashed line, connecting the first deformable quadrilateral to a leg or upright 27 which is designed to support a foot-rest 33, alone or in combination with the column or similar upright.

Each articulated system 13 finally includes a chair-back frame consisting of two uprights 35, each articulated on the first quadrilateral 13, opposite to the second quadrilateral 26, by means of the distance piece 20. In the illustrated example, the uprights 35 of the chair-back are also linked by a crosspiece 36.

In order to allow passage of the articulated structure 12 from the lowered or sitting position, as illustrated in FIG. 2, to the raised or standing position, as illustrated in FIG. 3, each articulated system includes a manoeuvring assembly 40, positioned between the first quadrilateral 17 and the chassis 2 and, more particularly, the two corresponding half-chassis 34.

Each manoeuvring assembly 40 includes a first lever 41, articulated on the rear part of the chassis by means of a pivot 42 and at the extremity of a second lever 43 by means of a pivot 44. The other extremity of the second lever 43 is then articulated on the first quadrilateral and, according to the illustrated example, on the lower bar 19, by means of a pivot 45.

Each manoeuvring assembly also includes a manoeuvring handle 49 which could be described as multigrip, to the extent that it has to allow the user of the wheelchair to apply a force to this handle, either in the lowered or sitting position illustrated in FIG. 2, or in the stand-up position illustrated FIG. 3, and also during the transition stage or the raising-lowering movement.

Figure 4:
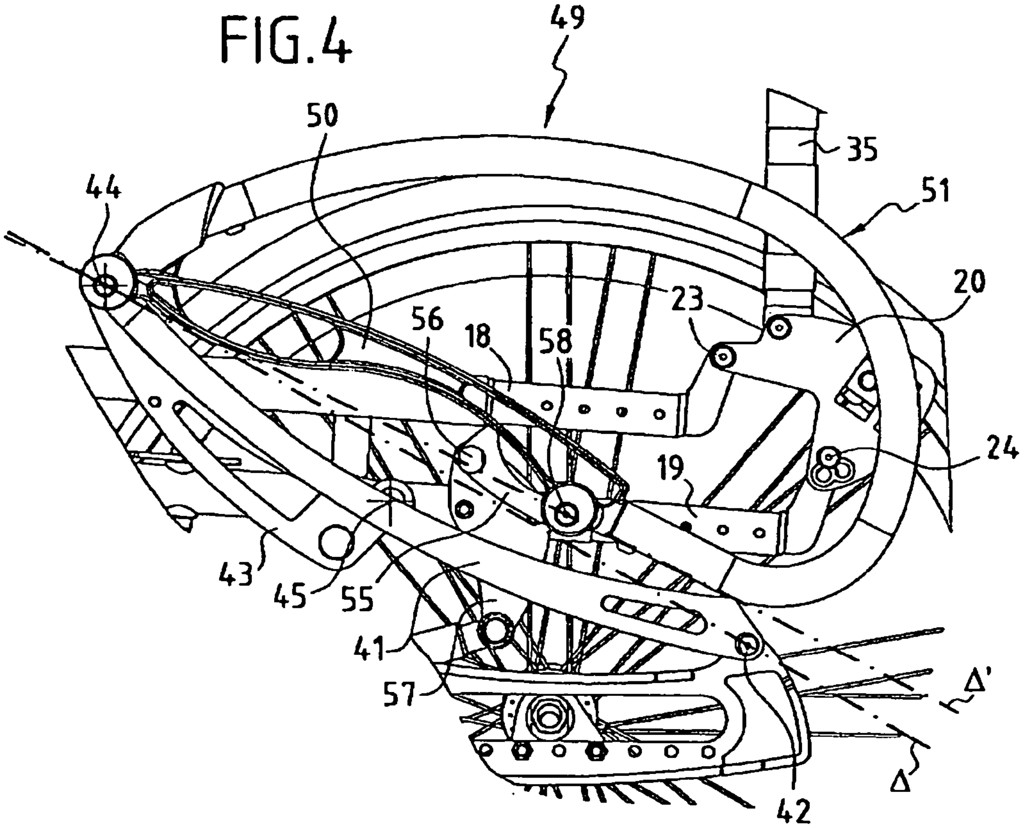
FIG. 4 is an enlarged, detailed view of FIG. 2.

To this end, as shown more particularly in FIGS. 3 and 4, each multigrip handle includes a handle body 50, equipped with a bow-shaped gripping arch 51 which is open at its centre 52. Given this method of implementation of the handle, it is possible to modify the general shape of the gripping arch to suit the requirements of the user, without affecting the overall design of the wheelchair.

According to an essential characteristic of the invention, the handle 49, and more precisely according to the illustrated example, the handle body 50 is articulated both on the first quadrilateral 17 and on the compass or the assembly composed of the first 41 and second 43 levers.

The handle is then articulated on the first deformable quadrilateral 17 and, in accordance with the example, on the lower arm 19 by means of a connecting-rod 55 which is connected by a pivot 56 to an element 57 attached to the lower arm 19. The connecting-rod 55 is also articulated on the handle 49 and more precisely on the handle body 50 by a pivot 58.

In a preferred form of implementation, the handle 49 is then linked to the two levers 41, 43 by the pivot 44 which then performs the double function of articulation of the said levers to each other and of the handle in relation to these same levers.

It is very advantageous that such an articulation of the handle allows the amplitude of movement of the handle 49 to be reduced during the stand-up movement, namely the passage from the sitting position of FIG. 2 to the standing position or stand-up position of FIG. 3. It should be noted that the distance between pivots 56 and 58 is chosen so as to set the amplitude of the handle movement in an optimal manner Nevertheless, in order to facilitate the raising and lowering movements, the stand-up wheelchair 1 also includes assistance resources 65. In accordance with this example, for each of the articulated systems, these assistance resources are composed of a gas-operated spring, positioned between the element 57 fixed to the upright of the first quadrilateral 17 and the front part of the chassis 2.

The implementation of such a gas-operated spring 65 effectively allows a substantial reduction in the force necessary for the raising action, and also a slowing of the lowering movement, thereby providing the user with a sensation of security and safety.

In order to achieve a certain stability in the sitting position, and to prevent any spontaneous triggering of the stand-up movement, the articulation of the levers 41, 43 is preferably designed so as to allow automatic locking in this position. To this end, and as FIG. 4 illustrates in greater detail, the axis of the articulation pivot 45 of the second lever 43 on the first quadrilateral 17 in the sitting position of the wheelchair is located below a straight line Δ passing firstly through the axis of the articulation pivot 44 between the first 41 and second 43 levers, and secondly through the axis of the articulation pivot 42 of the first lever 41 on the rear part of the chassis 2.

Nevertheless, it seems that in certain cases, due to the power of the gas-operated spring, an untimely or accidental pressure on the front part of the handle suffices to trigger the start of the raising action when in fact the user may have wished to remain in the sitting position.

It so happens, and most advantageously so, that the first locking action, performed by the articulation of levers 41, 43, could, in a preferred form of implementation, be reinforced by automatic locking of the articulated handle 49 in the sitting position of the wheelchair. In fact, it was observed that if the axis of the articulation pivot 56 of the connecting-rod 55 on the first quadrilateral 17, and here the lower arm 19, is located in the sitting position of the wheelchair above a straight line Δ' passing through, firstly, the axis of the articulation pivot 44 of the handle on the first 41 and second 43 levers and, secondly, the axis of the connecting pivot 58 between the handle 49 and the connecting-rod 55, then an automatic locking affect is achieved.

Thus, before starting the stand-up movement, it is first necessary to unlock the articulated handle by causing it to pivot, so that the pivot 56 passes below a straight line Δ' which, given the configuration adopted, requires a deliberate pulling force on the gripping arch and therefore cannot be the result of any false manoeuvre. This pulling force corresponds in quite a natural manner to the start of a turning-raising operation.

After this first unlocking action, it is then necessary to unlock the movement of the levers 41, 43 by causing the pivot 45 to pass above straight line Δ in order to continue with the pulling effort.

At this stage, and after executing these two consecutive unlocking operations, it is then possible to continue the turning movement of the handle in order to complete the raising operation in a fluid manner.

This preferred method of implementation of the wheelchair according to the invention, with an automatic double locking of the sitting position, also has the advantage of offering a very high degree of safety and security in the use of the wheelchair, by preventing any untimely triggering of the raising action, without the need for any additional braking system which would add to the weight of the chair. It should be emphasised that, according to the invention, the unlocking action of the sitting position is effected as part of of the rolling motion of the raising control, so that the user has no particular operation to perform before the raising operation.

In the same manner, a solution will be sought in order to provide for automatic locking of the stand-up position.

In the illustrated example, this locking is achieved by the configuration adopted for levers 41, 43. In fact, locking takes place when the articulation axis of the connecting pivot 44 between the first 41 and second 43 levers in the stand-up position of the wheelchair of FIG. 3 is located above a straight line Δ" passing firstly through the articulation pivot 42 of the first lever 41 on the rear part of the chassis 2 and, secondly, the articulation pivot 45 of the second lever 43 on the first quadrilateral 17 and here the lower arm 19.

This locking of the stand-up position is reinforced when the articulation axes of pivots 44, 58 of the handle in the stand-up position of the wheelchair are located on either side of straight line Δ".

In addition, in the stand-up position, the weight of the user is sufficient to accentuate the locking of the position, to the extent that it is not necessary to maintain any pressure on the handles. The user is then able to devote his or her efforts to the normal activities of his upper limbs.

Naturally however, various modifications can be made to the stand-up wheelchair as described above without straying outside the context this present invention.

The invention claimed is:

1. A stand-up wheelchair for handicapped and sick people, including a chassis (2) supporting an articulated structure (12) which includes, a seat (4), a foot-rest (33), a chair-back, and two symmetrical lateral articulated systems (13), each including:

- a first deformable polygon or quadrilateral (17) contributing to the support of the seat, composed of two bars, upper (18) and lower (19) respectively, articulated on the front part of the chassis (2) and connected to their rear parts by a distance piece (20),
- a second deformable polygon or quadrilateral (26), contributing to the support of the foot-rest,
- a chair-back frame (34, 35) articulated on the first quadrilateral (17), opposite to the second quadrilateral (26), by means of the distance piece (20) at least,
- and a manoeuvring assembly (40), positioned between the first quadrilateral and the chassis, which includes a first lever (41) articulated on the rear part of the chassis (2) and, at the extremity of a second lever (43) whose other extremity is articulated on the first quadrilateral (17), as well as a manoeuvring handle (49) which performs a function of command and control for the relative pivoting of the lateral systems, from a lowering position to a raising position of the structure in relation to the chassis and vice versa, characterised in that, for each manoeuvring assembly, the manoeuvring handle (49) is articulated, firstly, on the second lever (43) and/or the first lever (41), and secondly on the first quadrilateral (17) by means of a connecting-rod (55) whose first extremity is connected by a pivot (56) to the first quadrilateral and whose second extremity is connected by a pivot (58) to the manoeuvring handle (49).

2. A stand-up wheelchair according to claim 1, characterised in that the distance of the two pivots (56 and 58) of the connecting-rod is chosen so as to set at least the amplitude of movement of the manoeuvring handle.

3. A stand-up wheelchair according to claim 1, characterised in that the manoeuvring handle (49) is articulated on the assembly formed by the first lever (41) and the second lever (43) at the location of the connecting pivot (44) between the first (41) and second (43) levers.

4. A stand-up wheelchair according to claim 1, characterised in that, in order to provide for automatic locking of the articulated structure in the sitting position, the axis of the articulation the pivot (45) of the second lever (43) on the first quadrilateral (17), in the sitting position of the wheelchair, is located below a straight line (Δ) passing firstly through articulation pivot (44) of the first (41) and second (43) levers and, secondly, articulation pivot (42) of the first lever (41) on the rear part of the chassis (2).

5. A stand-up wheelchair according to claim 1, characterised in that, in order to provide for automatic locking of the articulated structure in the sitting position, the articulation axis of articulation pivot (56) of the connecting-rod on the first quadrilateral is located, in sitting position of the wheelchair, above a straight line (Δ') passing firstly through the articulation pivot (44) of the handle (49) on the first (41) and/or the second (43) lever and, secondly, the connecting pivot (58) between the handle (49) and the connecting-rod (55).

6. A stand-up type wheelchair according to claim 1, characterised in that, in order to provide for automatic locking of the articulated structure in the standing position, the articulation axis of the connecting pivot (44) between the first (41) and second (43) levers, in the standing position of the wheelchair, is located above a straight line (Δ") passing firstly through the articulation pivot (42) of the first lever (41) on the rear part of the chassis (2) and secondly, the articulation pivot (45) of the second lever (43) on the first quadrilateral (17).

7. A stand-up wheelchair according to claim 1, characterised in that in order to provide for automatic locking of the articulated structure in the stand-up position, the articulation axes of the pivots (44, 58) of the handle (49) in the stand-up position of the wheelchair are located on either side of a straight line (Δ") passing firstly through the articulation pivot (42) of the first lever (41) on the rear part of the chassis (2), and secondly the articulation the pivot (45) of the second lever (43) on the first quadrilateral (17).

8. A stand-up type wheelchair according to claim 1, characterised in that it includes an assistance device (65) for the raising-lowering movement.

* * * * *